United States Patent [19]

Goldschmidt et al.

[11] 3,939,088

[45] Feb. 17, 1976

[54] FIRE-RESISTANT HYDRAULIC FLUID

[75] Inventors: Alfred Goldschmidt, El Cerrito; Robert A. Stayner, Lafayette, both of Calif.

[73] Assignee: Chevron Research Company, San Francisco, Calif.

[22] Filed: Mar. 25, 1974

[21] Appl. No.: 454,638

[52] U.S. Cl. ......... 252/79 HF; 252/49.5; 252/56 D; 252/76; 252/309
[51] Int. Cl.² .. C09K 3/00; C10M 1/06; C10M 1/28
[58] Field of Search ............ 252/79, 76, 49.5, 56 D, 252/309

[56] References Cited
UNITED STATES PATENTS

| | | | |
|---|---|---|---|
| 3,255,108 | 6/1966 | Wiese | 252/49.5 X |
| 3,525,693 | 8/1970 | Lyle et al. | 252/56 D X |
| 3,838,052 | 9/1974 | Miller | 252/56 D X |

Primary Examiner—Harris A. Pitlick
Attorney, Agent, or Firm—G. F. Magdeburger; C. J. Tonkin; J. T. Brooks

[57] ABSTRACT

A water-in-oil emulsion finding use as a stable functional fluid comprises about 19 to about 50 weight percent water, about 80 to about 49 weight percent mineral oil and a small amount of a hydrocarbyl-substituted succinic acid mono ester of a polyoxyethylene mono-ol. The mono-ol has an average molecular weight of about 200–1,000 and the hydrocarbyl substituent is from about 750 to about 2,000 average molecular weight.

7 Claims, No Drawings

FIRE-RESISTANT HYDRAULIC FLUID

BACKGROUND OF THE INVENTION

Recently, hydraulic equipment and fire-resistant hydraulic fluid applications have realized a substantial growth in usage. The Federal Coal Mine Health and Safety Act of 1969 and the Occupational Health and Safety Act (OHSA) require specific safety standards which are expected to lead to new applications and increased usage of fire-resistant functional fluids including lubricants.

Emulsions provide an important source of functional fluids having very low inflammability. Of these, the water-in-oil emulsion is the most recent and most important development. All of the emulsions and functional fluids herein discussed are of this type. In these fluids, water is the dispersed phase and oil is the continuous phase. The stability and homogeneity of the fluid is maintained by the addition of an emulsifier. The choice of the emulsifier is critical, and the emulsion is normally very sensitive to temperature variation or temperature cycling from hot to cold to hot, etc.

An emulsion deteriorates by undergoing emulsion inversion and water separation in whole or in part. Inversion is defined as the change from a water-in-oil emulsion to an oil-in-water emulsion, i.e., after inversion the mineral oil is no longer the continuous phase and water separation can be observed. As a result of such emulsion deterioration, the anti-wear property of the emulsion is decreased very substantially thereby producing premature hydraulic pump failure. The choice of emulsifier is critically important in preventing deterioration of the emulsion over a reasonable period of use and a range of temperatures, U.S. Pat. No. 3,378,494.

SUMMARY

A water-in-oil emulsion finding use as a stable functional fluid comprises about 19 to about 50 weight percent water, about 80 to about 49 weight percent mineral oil, and in an amount sufficient to stabilize the emulsion against deterioration leading to substantial loss of anti-wear capability, a certain hydrocarbyl-substituted succinic acid monoester of a polyoxyethylene mono-ol. Said hydrocarbyl substituent is from about 750 to about 2,000 average molecular weight and said polyoxyethylene mono-ol has an average molecular weight of from about 200 to about 1,000.

DETAILED DESCRIPTION OF PREFERRED EMBODIMENTS

The formation of stable water-in-oil emulsions is found to depend on a critical balance of amphipathic properties in the emulsifier. An amphipathic molecule is an organic species encompassing in the same molecule two dissimilar structural groups, e.g., a water-soluble and a water-insoluble moiety. The composition, solubility properties, relation and relative sizes of these dissimilar moieties in relation to the overall molecular configuration determines the efficiency of a monoester in stabilizing a water-in-oil emulsion. Critical amphipathic balance is achieved in the monoester through the choice of a hydrocarbyl group and a polyoxyethylene mono-ol within the limits set forth.

The hydrocarbyl substituent is a water-insoluble, or lipophilic moiety, while the polyoxyethylene moiety is water-soluble or hydrophilic. A critical balance between these entities is necessary to achieve water-in-oil emulsion stability as shown by the fact that small changes lead to inversion of the emulsion, water separation, emulsion deterioration and wear.

A stable water-in-oil emulsion which finds use as a hydraulic fluid, or other functional fluid, including use as a lubricant where nonflammability is required, is found to be the composition comprising from about 19 to about 50 weight percent of water, preferably from about 29 to about 50 weight percent water, about 80 to about 49 weight percent of mineral oil, preferably from about 70 to about 49 weight percent mineral oil, and in an amount sufficient to stabilize the emulsion against deterioration, normally about 0.1–5 weight percent and preferably about 0.5–2 weight percent, a certain hydrocarbyl-substituted succinic acid monoester of a polyoxyethylene mono-ol.

The succinic acid monoester will normally be hydrocarbyl-substituted with a hydrocarbon group of from about 500 to about 5,000 average molecular weight, preferably from about 750 to about 2,000 average molecular weight and most preferably from about 900 to about 1,400 average molecular weight. Hydrocarbyl, as used in this invention in describing substituents in succinic acid and anhydride, and as used in describing the monoester-emulsifier of the present invention, denotes an organic radical composed of carbon and hydrogen which may be aliphatic, alicyclic, aromatic or combinations thereof, e.g., alkyl, aryl, aralkyl. Elements other than carbon and hydrogen, such as chlorine or oxygen, form a minor, insubstantial, sometimes adventitious, component of a hydrocarbyl group. Preferably, the hydrocarbyl group will be relatively free of aliphatic unsaturation, i.e., ethylenic and acetylenic, particularly acetylenic unsaturation. The hydrocarbyl group is preferably aliphatic, having preferably from 0 to 2 sites of ethylenic unsaturation and most preferably from 0 to 1 such site. Hydrocarbyl groups derived from a polyolefin, itself derived from olefins (normally 1-olefins) of from 2 to 6 carbon atoms (ethylene being copolymerized with an olefin of at least 3 carbon atoms), or from a high molecular weight petroleum-derived hydrocarbon, are preferred, and of these polyisobutenyl is most preferred. Illustrative sources for the high molecular weight hydrocarbyl substituents are petroleum mineral oils, such as naphthenic bright stocks, polypropylene, polyisobutylene, poly-1-butene, copolymers of ethylene and propylene, poly-1-pentene, poly-4-methyl-1-pentene, poly-1-hexene, poly-3-methylbutene-1, etc.

The hydrocarbyl-substituted succinic acid and anhydrides are preferably derived from the addition of a polyolefin to maleic acid or anhydride, in which case the double bond of the maleic acid or anhydride becomes saturated and there remains in the hydrocarbyl at least 1 olefinic double bond. If it is desired, the olefinic bond may be saturated by hydrogenation. A typical preparation of a hydrocarbyl-substituted succinic anhydride has been described, for example, in U.S. Pat. No. 3,024,195. As used herein, the words "succinic acid" or "succinic anhydride" denote the entire class of succinic acid generating compounds, including the acid, anhydride, acid halide, or ester, which function to yield the products of the present invention.

The mono-ol which together with the hydrocarbyl-substituted succinoyl moiety composes the ester-emulsifier of the present composition is preferably a polyoxyethylene mono-ol of a C1–C5 alkanol, that is, a mono-ol of the form RO(CH2 CH2 O)nH wherein R is a C1–C5 alkyl group and $n$ is an integer having an average value from about 4 to about 20 and preferably from about 6 to about 8. The total molecular weight of said mono-ol will range from about 200 to about 1,000 and preferably from about 315 to about 385. The addition of ethylene oxide to an alkanol to produce the polyoxyethylene mono-ols of the present invention can be accomplished according to catalyzed reactions which are known in the art. In general, the polyoxyethylene mono-ols are poly-disperse mixtures of compounds that differ in polymer chain length. However, their properties approximate those of the molecule represented by their average composition.

The monoester is normally produced by the direct reaction of the polyoxyethylene mono-ol with hydrocarbyl-substituted succinic anhydride in a mol ratio of about 1:1 at a temperature of from about 120° to about 175°C reacted for a period of from about 3 to about 24 hours.

EXAMPLE 1

1,150 grams of the polybutene succinic anhydride having a molecular weight of about 1,200 in 1,150 grams of a neutral petroleum oil is heated to 270°F and added to 450 grams of methoxy-capped polyoxyethylene glycol (i.e., derived from methanol and ethylene oxide) of about 380 average molecular weight. The mixture was stirred for about 20 hours at 290°F. The product is the mono-ester of polybutene succinic acid.

COMPOSITIONS

The mineral oils which are suitable for purposes of the present invention comprise hydrocarbons and mixtures of hydrocarbons which are aliphatic, naphthenic and aromatic hydrocarbons. Individual hydrocarbons will contain from about 8 to about 50 carbon atoms and be chosen from the classes of aromatic, alkylaromatic, alkane, alkene, paraffinic and naphthenic molecules. The hydrocarbon oil is present in the functional fluid emulsion to the extent of 80–49 percent by weight of the total composition. An important characteristic of the hydrocarbon oil is its viscosity. The viscosity of the mineral oil should range from about 80 to about 500 SSU at 100°F (37°C) and from about 25 to about 70 SSU at 210°F (100°C). The hydrocarbon oil may be a dewaxed mineral oil, or a synthetic hydrocarbon oil.

The mineral oil, water and monoester-emulsifier form the fire-resistant base stock of the functional fluid. Specific additives are combined with this emulsion to impart particular properties. For example, antiwear agents, antioxidants, hydrolysis suppressants, rust inhibitors, antifoamants, and viscosity index improvers may be added in small percentages.

Neutral or overbased dispersants such as calcium or barium alkaryl sulfonates and phenates may be present in a functional fluid emulsion in an amount from about 5 mM/kg to about 25 mM/kg. In addition, auxiliary emulsifiers which are known to the art may also be present in these emulsions to the extent of from 0.1 to 2 percent by weight. For example, lecithin may be utilized as an auxiliary emulsifier. Corrosion inhibitors such as amine carboxylates, amines, hindered phenols, and zinc dithiophosphates will also normally be present in small percentages of from 0.01–2 percent by weight.

EXAMPLE A

A non-flammable hydraulic fluid is made by combining 1.5 percent of the emulsifier of Example 1 with 56.9 weight percent of a naphthenic base oil having a viscosity of 100 SSU at 100°F, 40 weight percent of water, 10mM/kg zinc dialkyl dithiophosphate, 0.3 weight percent lecithin, and 0.3 weight percent of an amine carboxylate.

A typical functional fluid composition within the scope of the present invention comprises 19–50 weight percent water, 80–48 weight percent mineral oil, about 0.5–2 weight percent mono-ester of an alkenyl succinic anhydride of about 1,000 molecular weight and a methoxy-capped polyoxyethylene glycol (i.e., derived from methanol and ethylene oxide) of about 315–385 average molecular weight, and 5–20mM/kg of zinc dihydrocarbyl dithiophosphate.

EVALUATION

Of the three principal properties to be subjected to tests in a water-in-oil emulsion hydraulic fluid, namely fire resistance, wear and stability, the principal critical advantage of the composition of the present invention is the stability of the emulsion. As indicated previously, emulsion stability is affected by temperature to a considerable degree. In our emulsion stability test, the emulsion is heated in an oven for 48 hours at 185°F (85°C) in a graduated cylinder. Upon being brought to room temperature, the existence of water separation is measured by the amount of clear aqueous fluid present at the bottom of the cylinder. Any amount of water separation is considered unsatisfactory, but up to 5 ml oil separation per 100 ml of emulsion is tolerable. In the following table the results of our test on emulsions containing 1.5 weight percent of emulsifier in a 40 weight percent water and about 60 weight percent oil are given. The monoesters of Table I are esters of a hydrocarbyl-substituted succinic anhydride wherein said hydrocarbyl group is a polyisobutenyl group of about 1100 average molecular weight. The imide is formed from the reaction of the same polyisobutenyl-succinic anhydride with an amino-substituted polyoxyethylene mono-ol. The monoesters are formed from the reaction of said polyisobutenyl succinic anhydride with a polyoxypropylene methanol and a polyoxyethylene methanol respectively. The degree of oxyalkylenation is given in parenthesis, i.e., as the average number of oxyalkylene groups in the mono-ol.

TABLE 1

| Water-in-Oil Emulsion Stability | |
|---|---|
| Emulsifier | Rating |
| monoester of polyoxypropylene (7) | unsatisfactory |
| monoester of polyoxyethylene (8) | satisfactory |
| imide of amino polyoxyethylene (8) | unsatisfactory |

The results of Table I demonstrate the critical sensitivity of the water-in-oil emulsions of the present invention to amphipathic balance in the structure of the emulsifier. Changes in molecular weight, and chemical functionality, outside the scope of the limitations delineated herein, produces water-in-oil emulsions which are unable to meet the strict requirements of the emulsion stability test.

What is claimed is:

1. A water-in-oil emulsion finding use as a functional fluid comprises from about 19 to about 50 weight percent of water, from about 80 to about 49 weight percent of mineral oil and in an amount sufficient to stabilize said water-in-oil emulsion a hydrocarbyl-substituted succinic acid monoester of a polyoxyethylene mono-ol of average molecular weight from about 200 to about 1,000 terminated with an alkyl group of 1 to 5 carbon atoms, wherein said hydrocarbyl substituent is of from about 750 to about 2,000 average molecular weight.

2. A water-in-oil emulsion according to claim 1 wherein said hydrocarbyl substituent is a polyolefin itself derived from C2–C6 mono-olefins with the proviso that ethylene is copolymerized with a higher olefin.

3. A water-in-oil emulsion according to claim 2 wherein said polyolefin is polyisobutylene.

4. A water-in-oil emulsion according to claim 1 wherein said alkanol is methyl alcohol.

5. A water-in-oil emulsion according to claim 1 wherein said polyoxyethylene mono-ol contains an average of from 5 to 10 oxyethylene groups.

6. A water-in-oil emulsion according to claim 1 wherein said polyoxyethylene mono-ol is of about 315–385 average molecular weight and is derived from methanol, and wherein said hydrocarbyl substituent is of from about 900 to about 1,400 molecular weight.

7. A water-in-oil emulsion according to claim 1 wherein said amount sufficient to stabilize said water-in-oil emulsion is about 0.1–5 weight percent.

* * * * *